(12) United States Patent
Lucioni

(10) Patent No.: US 6,671,333 B1
(45) Date of Patent: Dec. 30, 2003

(54) METHOD AND APPARATUS FOR RECOVERING A PAYLOAD SIGNAL FROM A SIGNAL THAT HAS BEEN MODULATED BY FREQUENCY SHIFT KEYING

(75) Inventor: Gonzalo Lucioni, Witten (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/449,726

(22) Filed: Nov. 24, 1999

(30) Foreign Application Priority Data

Nov. 25, 1998 (DE) .......................... 198 54 458

(51) Int. Cl.⁷ ...................... H03D 3/00; H04L 27/14
(52) U.S. Cl. ...................... 375/334; 329/300; 327/2
(58) Field of Search ...................... 375/316, 334, 375/340, 375, 377; 327/2, 3, 47; 329/300

(56) References Cited

U.S. PATENT DOCUMENTS 5,974,096 A * 10/1999 Seki et al. .................. 375/340

FOREIGN PATENT DOCUMENTS

| DE | 42 19 417 | 12/1993 |
|---|---|---|
| DE | 195 34 262 | 9/1995 |
| DE | 195 49 600 | 3/1996 |
| DE | 197 00 740 | 9/1998 |
| GB | 2 234 411 | 1/1991 |
| JP | 63294003 | 11/1988 |
| JP | 10075122 | 3/1998 |
| JP | 10136311 | 5/1998 |

OTHER PUBLICATIONS

Kammeyer "Nachrichtenubertragung" 1992, pp. 20–23.

* cited by examiner

*Primary Examiner*—Jean B. Corrielus
(74) *Attorney, Agent, or Firm*—Bell Boyd & Lloyd

(57) ABSTRACT

A method and an apparatus are described for recovering a payload signal from an FSK signal that has been modulated by frequency shift keying. From the modulated signal a discrete-time series of sampled values are determined for which the phase difference relative to a preceding sampled value is respectively determined as well. The method and the apparatus can be used in a digital PBX to which the modulated signal is fed via an analog telephone network.

15 Claims, 2 Drawing Sheets

METHOD AND APPARATUS FOR RECOVERING A PAYLOAD SIGNAL FROM A SIGNAL THAT HAS BEEN MODULATED BY FREQUENCY SHIFT KEYING

BACKGROUND OF THE INVENTION

1. Field of the Invention

The present invention relates to both a method and an apparatus for recovering a payload signal from an FSK signal that has been modulated by frequency shift keying wherein, from such signal, a discrete-time series of sampled values are determined for which a phase difference relative to a preceding sampled value is respectively determined.

2. Description of the Prior Art

For transmitting subscriber information such as a call number, via an analog telephone network, frequency shift keying is applied. Such frequency shift keying also is referred to as digital frequency modulation, or FSK. FSK stands for frequency shift keying. Frequency shift keying makes possible the transmission of digital signals by alternating between a frequency above the carrier frequency of a carrier signal and a frequency below this carrier frequency in the rhythm of a rectangular modulation signal. In this way, the required bivalence of the signal is guaranteed.

The method of frequency shift keying is customarily used in a frequency band of 300 Hz to 3400 Hz. The frequencies in this frequency band which lie above or below the carrier frequency of 1700 Hz are referred to as mark frequencies or, respectively, space frequencies and are defined as 1200 Hz or, respectively, 2200 Hz for the USA and as 1300 Hz or, respectively, 2100 Hz for Europe. The rate with which the subscriber information is transmitted typically amounts to 1200 bits/s.

When the transmitted subscriber information is supposed to be processed in a digital PBX connected to the analog telephone network, the payload signal containing the subscriber information, which is impressed on the carrier signal by the frequency shift keying, must be recovered from the modulated signal; that is, the modulated signal that is fed to the digital PBX must be demodulated with the known prior art, it has been impossible to demodulate signals that were modulated by frequency shift keying (henceforth referred to as FSK signals) subsequent to the sampling and digitizing of such signals. The reason for this is that the sampling rate with which the analog signals are sampled in known digital PBXs is too low. The sampling rate of 8000 Hz that is generally used is not suitable for executing the demodulation of the digitized FSK signals in a time-discrete manner using known methods.

For example, one known method provides the utilization of zero crossing discriminators which are intended to determine the zero crossings of the FSK signal and, thus, to make it possible to recover the payload signal. But these zero crossing discriminators are unusable given a sampling rate of 8000 Hz or lower since, in this case, there are too few sampled values present within a sampling period to be able to determine the zero crossings of the FSK signal with sufficient precision. Given a sampling rate of 8000 Hz, one period of the space frequency stated above for the USA contains approximately 3.6 sampled values; that is, 1.8 sampled values per zero crossing. This number of sampled values is insufficient for a reliable demodulation of the digitized FSK signal.

But to increase the sampling rate for purposes of a time-discrete demodulation of the FSK signal would require a significant additional technical outlay which, accordingly, also increases the difficulty with respect to cost. Therefore, the prior art has made use only of analog circuitry for demodulating the FSK signal which has known disadvantages compared to digital circuitry, such as lower transmission reliability due to the increased error rate.

It is therefore, an object of the present invention to formulate both a method and an apparatus which make it possible to reliably demodulate a signal that has been generated by frequency shift keying in a time-discrete manner with a low sampling rate.

SUMMARY OF THE INVENTION

The present invention achieves this object by a method in which a discrete-time series of sampled values are determined from the modulated signal and, for the sampled values, the phase difference is respectively determined in relation to a preceding sampled value whose chronological spacing from the sampled value in question is lower than the bit duration within the modulated signal.

The present invention is based on the recognition that the modulated signal represents a pure sine or cosine signal within a sufficiently short time interval. The upper limit of the maximum length of this time interval, that is the greatest possible chronological spacing of the observed sampled value from a preceding sampled value, is defined by the bit duration. The bit duration indicates the length of a signal portion of the modulated signal that is required in order to represent a bit that forms the smallest possible unit of information. The phase difference between two consecutive sampled values whose chronological spacing from one another is defined by such a sufficiently short time interval depends on the frequency that the modulated signal has in this time interval. It is, thus, possible to unambiguously allocate one of the two frequencies that characterize the two possible binary states in the analog signal to the observed sampled value based on the determination of this phase difference. The phase differences that are determined for the individual sampled values can be acquired directly as demodulation signals, thus reproducing the payload signal that has been impressed on the modulated signal by frequency shift keying.

As opposed to the known methods, the present invention makes it possible to demodulate the modulated signal after it has been sampled and digitized. As such, it also makes it possible to use digital circuitry with all its known advantages over analog circuitry. In particular, the inventive method can be applied in a digital PBX in order to demodulate, in a time-discrete manner, the signal that has been received thereby and that subsequently has been sampled and digitized.

The present invention overcomes the problem that is known from the prior art of demodulating a signal that has been modulated by frequency shift keying with a relatively low sampling rate in a time-discrete manner. Specifically, the proposed method is largely independent of the sampling rate, as long as the chronological spacing of the sampled values that are used to determine the above described phase differences does not exceed one bit duration. This aspect of the invention allows a flexible application of the method of the present invention which takes into account the respective technical framework conditions. The present invention can be applied in arbitrary systems in which an FSK signal is to be sampled with a relatively low sampling rate and subsequently demodulated.

In an embodiment of the present invention, a corresponding analytical sampled value is determined from the sampled values wherein the observed sampled value is allocated, on one hand, to the real portion of the analytical signal in unmodified form and, on the other hand, to the imaginary portion of the analytical signal shifted −90° in phase. The phase difference for the observed sampled value, thus, can be determined on the basis of the analytical sampled value corresponding thereto and the analytical sampled value that corresponds to the preceding sampled value used to determine the phase difference. Since, in an analytical sampled value such as this, all the phase information is contained in both its real portion and in its imaginary portion, this development of the present invention makes it possible to mask out as it were, the frequency that carries a negative sign, for example, which is usually present in the real sampled value of the sinusoidal cosine-shaped modulated signal in accordance with the rules of Fourier analysis. This procedure specifying the frequency of one operational sign, for instance the frequency that carries the positive sign, permits the unambiguous determination of the phase difference occurring between two consecutive sampled values.

For the observed sampled value, the determined phase difference can be related to a reference phase difference that occurs in a carrier signal on which the modulated signal is based. The amplitude values of the demodulated signal that has been detected according to this embodiment of the method are, thus, divided around the value zero into positive or, respectively, negative values. The time sequence of the two binary states that is to be recovered from the modulated signal thus can be easily identified via positive or, respectively, negative amplitude values of the demodulation signal.

In a further embodiment of the method, the sampled values are fed to a digital filter that determines the real portion and the imaginary portion of the analytical sampled value corresponding to the observed sampled value. The real portion and the imaginary portion of the analytical sampled value are then fed to a phase detection unit that detects the phase difference for the observed sampled value. Advantageously, a non-recursive filter can be used as all-pass filter. This type of non-recursive filter can be implemented as an all-pass filter that provides for the desired phase shift in the prescribed frequency range and that is known in the prior art as a Hilbert transformer.

According to another embodiment of the present invention, a device is provided for executing the method just described. The above-cited technical effects also apply for this device.

Additional features and advantages of the present invention are described in, and will be apparent from, the Detailed Description of the Preferred Embodiments and the Drawings.

DETAILED DESCRIPTION OF THE PREFERRED EMBODIMENTS

Figure 1:
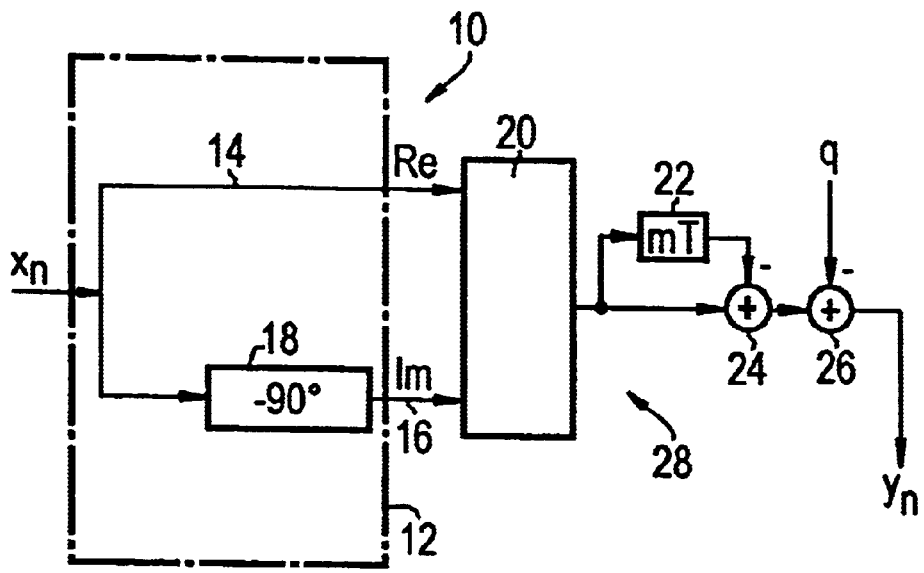
FIG. 1 shows an embodiment of the receiving means of the present invention.
Figure 2:
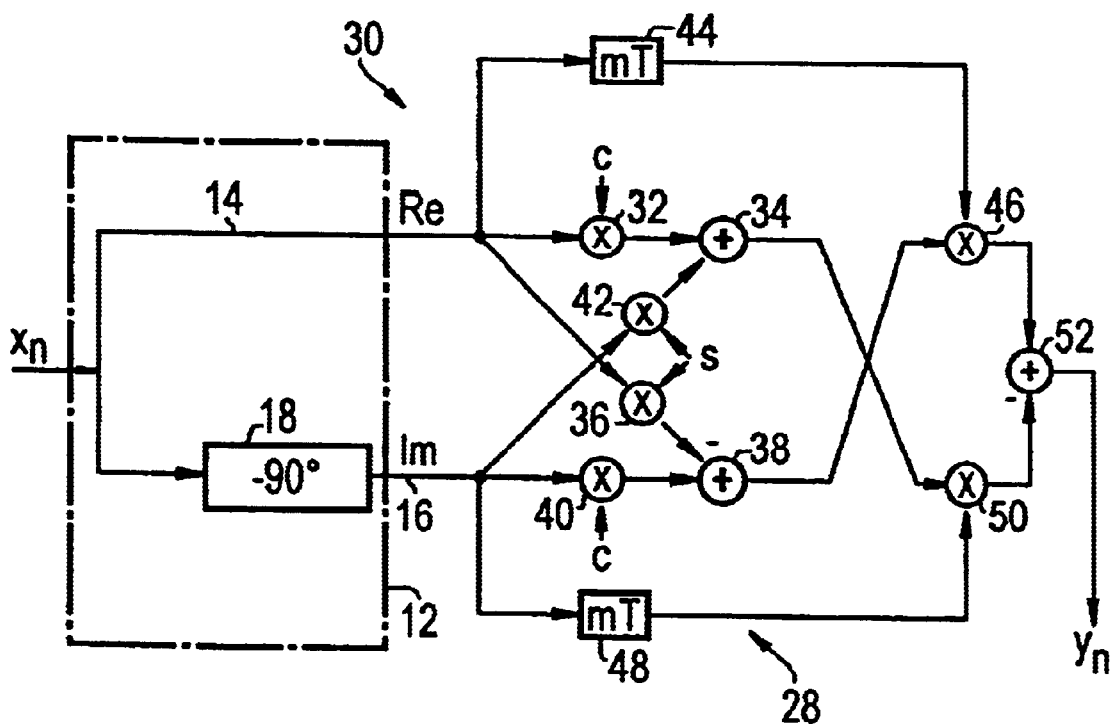
FIG. 2 shows an alternative embodiment of the receiving means.
Figure 3A:
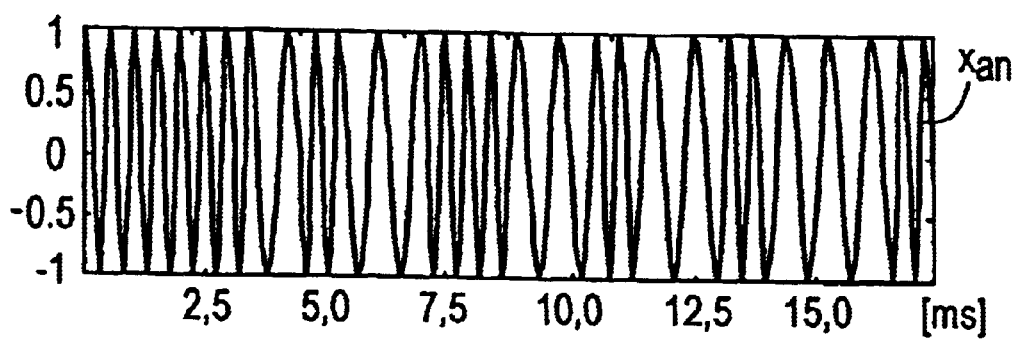
FIG. 3a shows time diagram of an analog signal that is generated by frequency shift keying in accordance with the teachings of the present invention.

With the aid of FIGS. 1 to 3c, the demodulation is depicted of an analog signal $x_{an}$ as illustrated in FIG. 3a which is transmitted to a digital PBX via an analog telephone network (not illustrated). The digital PBX contains a receiving means, which is referenced 10 in FIG. 1 in a first embodiment and is referenced 30 in FIG. 2 in a second embodiment.

For transmitting subscriber information such as a call number, the analog signal $x_{an}$ is modulated according to the known modulation method of frequency shift keying. As such, it represents a bit string that reproduces the subscriber information. The time sequence of the two possible binary states is defined by a sequence of signal portions of the modulated analog signal $x_{an}$, to which one of two possible frequencies $f_{mark}$ and $f_{space}$ is respectively allocated. The two frequencies $f_{mark}$ and $f_{space}$ of the modulated signal $x_{an}$ are generated in that a carrier signal with a predefinable carrier frequency $f_0$ is modified in known fashion such that its frequency, which is originally equal to the carrier frequency $f_0$, is converted into the frequency $f_{mark}$ or, respectively, $f_{space}$.

In the example illustrated in FIGS. 1 to 3c, the transmission of the analog signal $x_{an}$ via the analog telephone network is accomplished in a frequency band of 300 Hz to 3400 Hz. The carrier frequency amounts to 1700 Hz, the frequency $f_{mark}$ amounts to 1300 Hz, and the frequency $f_{space}$ amounts to 2100 Hz. With these specifications the subscriber information can be transmitted to the digital PBX via the analog telephone network at a transmission rate of 1200 Bit/s. It should be noted that the time diagrams illustrated in FIGS. 3a to 3c necessarily relate to the second embodiment, which is illustrated in FIG. 2. In principle, however, since the same time diagrams apply to the first embodiment illustrated in FIG. 1 as to the second embodiment, for purposes of better understanding, even the first embodiment is explained with reference to FIGS. 3a to 3c.

Figure 3B:
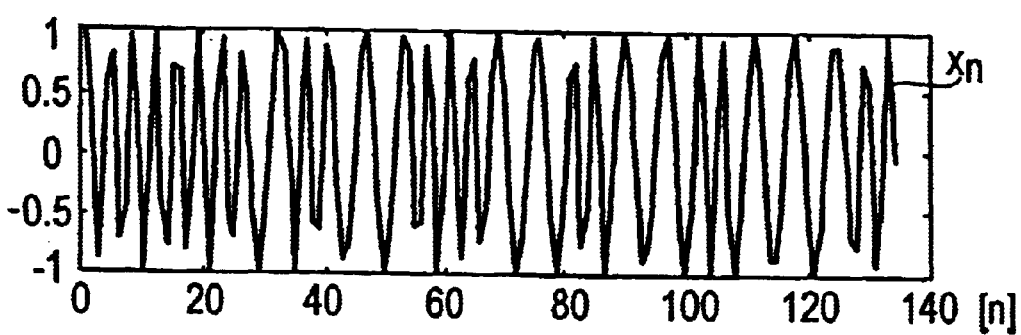
FIG. 3b shows the time diagram of a sampled signal that is generated by sampling the signal illustrated in FIG. 3a at a rate of 8000 Hz.

Since the digital PBX can only process the subscriber information in digital form, the analog signal $x_{an}$ transmitted via the telephone network is sampled and digitized in known fashion before being fed to the receiving means 10 or, respectively, 30 illustrated in FIGS. 1 and 2. The sampled signal generated from the signal $x_{an}$ by sampling at a rate of 8000 Hz and subsequent digitizing is illustrated in FIG. 3b and is referenced $x_n$. The abscissa of FIG. 3b indicates the number n of samplings that have been performed at the analog signal $x_{an}$ in the time range illustrated by the abscissa in FIG. 3a. The sampled signal $x_n$ illustrated in FIG. 3b is, thus, a series of individual sampled values which are likewise referenced $x_n$ when referred to individually.

The principle of the present invention is detailed below with the aid of FIG. 1. The receiving means 10 of the digital PBX, which is not illustrated, has the function of recovering the subscriber information that is impressed on the received sampled signal $x_n$; i.e., the bit string that is transmitted via the analog telephone network from said received sampled signal $x_n$. The functionality of the receiving means 10 is illustrated in FIG. 1 is based on the acknowledgment that the sampled signal $x_n$ is a pure sine or, respectively, cosine signal during a sufficiently short time interval (that is, over a low number of samples), and so the phase difference of two sampled values within this time interval is proportional to the frequency of the sine or cosine signal. A detected phase difference can be allocated unambiguously to one of the two frequencies $f_{mark}$ and $f_{space}$ according to whether the sampled signal $x_n$ is transmitted in the observed time interval with the frequency $f_{mark}$ or with the frequency $f_{space}$. Concretely, the length of the time interval is proportioned so as to be shorter than the bit duration within the modulated signal $x_{an}$. The bit duration indicates the time required in order to represent one individual binary state of the two possible states; for instance, 0 or 1. In the example discussed here, a bit duration of approximately 83 ms follows from the transmission rate of 1200 bit/s.

The sampled signal $x_n$ received from the receiving means 10 is first fed to a digital filter 12 which generates an analytical signal $\bar{x}_n$ that corresponds to the real sampled signal $x_n$ therefrom. The analytical signal $\bar{x}_n$ is a series of analytical sampled values which are, likewise, referenced $\bar{x}_n$ when referred to individually. The $n^{th}$ analytical sampled value $\bar{x}_n$ is defined by the relation $$\bar{x}_n = A \cdot e^{j(2\pi f_0 nT + \phi_n)} = Re(\bar{x}_n) + j \cdot Im(\bar{x}_n) \qquad (1)$$

whereby $f_0$ references the carrier frequency, $\phi_n$ references the phase of the $n^{th}$ sampled value $x_n$ relative to the non-modulated carrier signal, T references the sampling period which amounts to 125 μs at 8 kHz, A references the amplitude, Re references the real portion of the analytical sampled value $\bar{x}_n$, and Im references the imaginary portion of the analytical sampled value $\bar{x}_n$. In the digital filter 12, the received sampled value $x_n$ is fed to a real portion branch 14, on one hand, and to an imaginary portion branch 16, on the other hand. Via the real portion branch 14, the sampled value $x_n$ is outputted unmodified as the real portion of the analytical sampled value $\bar{x}_n$, while the sampled value $x_n$ in the imaginary portion branch 16 is phase shifted by a phase shifting unit 18 −90° relative to the sampled value $x_n$ transmitted via the real portion branch 14. The digital filter 12 thus delivers a value that represents the imaginary portion of the analytical sampled value $\bar{x}_n$ via the imaginary portion branch 16.

As digital filter 12, an all-pass filter can be used that performs the above-described phase shift, generating the analytical signal $\bar{x}_n$ in the observed frequency range. All-pass filters such as this, also referred to as Hilbert transformers, are known in the prior art so that a more detailed description of the digital filter 12 can be forgone at this point.

The digital filter 12 delivers the analytical sampled value $\bar{x}_n$ to a computing unit 20 such that the sampled value is split into a real portion and an imaginary portion. From the analytical sampled value $\bar{x}_n$, the computing unit 20 determines the relative phase $\phi_n$ relative to the non-modulated carrier signal for each sample n and then outputs such relative phase. Different methods can be employed in the computing unit 20 to determine the phase $\phi_n$. The CORDIC algorithm, which is known in the prior art is an example of such a method, this algorithm permitting a relatively low-outlay phase computation. CORDIC stands for Coordinate Rotation Digital Computer.

A delay element 22 and an adder 24 are connected to the computer unit 20 at the output side. The phase $\phi_n$ that is determined in the computing unit 20 is fed to adder 24 directly, on one hand, and via the delay element 22, on the other hand. The delay element 22 delays the phase On by m-fold the sampling period T. m is a positive whole number. The signal outputted by the delay element 22 is referenced $\phi_{n-m}$ and represents the relative phase of the $(n-m)^{th}$ analytical sampled value $\bar{x}_{n-m}$ compared to the non-modulated carrier signal. The adder 24 calculates the phase difference $\phi_n - \phi_{n-m}$ between the $n^{th}$ and the $(n-m)^{th}$ analytical sampled values $\bar{x}_{n-m}$. The result of the difference formation performed by the adder 24 is delivered to another adder 26, which extracts an offset value q from this result. This offset value q states the phase difference between the nth the $(n-m)^{th}$ sampled value of the non-modulated carrier signal. By integrating the offset value q, the adder 26 delivers a phase difference signal $y_n$ that is related to the non-modulated carrier signal. A positive phase difference signal $y_n$ indicates that the phase difference determined for the modulated sampled signal $x_n$ is greater than the phase difference occurring in the non-modulated carrier signal. Thus, in consideration of the above described dependency of the phase difference on the frequency of the respective signal, it can be concluded from a positive value of the phase difference signal $y_n$ that the observed sampled value should be allocated to the frequency $f_{space}$ which is the greater of the two frequencies $f_{mark}$ and $f_{space}$ Conversely, a negative phase difference signal $y_n$ indicates that the observed sampled value should be allocated to the frequency $f_{mark}$ which is smaller than the frequency $f_{space}$. If a phase difference signal of 0 is determined for the observed sampled value, then the carrier frequency $f_0$ should be allocated thereto.

The receiving means 10 according to FIG. 1, whose essential functional units are the digital filter 12 and a phase detecting unit 28 consisting of the components 20 to 26, thus makes it possible to determine the phase difference signal $y_n$ of each sampled value $x_n$ which enables the allocation to one of the two frequencies $f_{mark}$ and $f_{space}$ and, thus, makes possible the recovery of the payload signal (that is, the bit string), that is transmitted with the analog signal $x_{an}$. The phase difference signal $y_n$ directly represents the demodulated signal, which is illustrated in the time diagram of FIG. 3c for the embodiment according to FIG. 2, which is described below.

FIG. 2 depicts a receiving means 30 as a further exemplifying embodiment of the present invention. The components of the receiving means 30 that are provided with the reference characters already used in FIG. 1 have the same function as the corresponding components in FIG. 1 and are therefore not described again. The phase difference signal $y_n$ that is generated by the receiving means 30 as demodulation signal is defined by the following relation:

whereby $\bar{z}$ is a complex offset value or centering factor that is defined in the relations (3) and (3') below:

$$\bar{z} = e^{-j2\pi f_0 mT} \qquad (3)$$

$$\bar{z} = c - js \qquad (3')$$

In equation (3') the coefficient c stands for $\cos(2\pi f_0 mT)$ and the coefficient s stands for $\sin(2\pi f_0 mT)$. The phase difference signal $y_n = A^2 \cdot \sin(\phi_n - \phi_{n-m})$ on the left side of equation (2) is generated in that first the $n^{th}$ analytical sampled value $\bar{x}_n$ is multiplied by the centering factor $\bar{z}$; the resulting product is multiplied by the conjugated complex value of the $(n-m)^{th}$ sampled value $\bar{x}_{n-m}$; and finally the imaginary portion is formed by the result of this multiplication. The centering factor $\bar{z}$, which is defined by the coefficients c and s, has the same function in the embodiment of FIG. 2 as the offset value q has in the embodiment illustrated in FIG. 1.

The complex multiplication of the analytical sampled value $\bar{x}_n$ by the centering factor $\bar{z}$ is accomplished in the receiving means 30 as follows: the real portion of the analytical sampled value $\bar{x}_n$ that is outputted on the real portion branch 14 of the digital filter 12 is fed to a multiplier 32, which multiplies the real portion of the analytical sampled value $\bar{x}_n$ by the coefficient c and delivers the result of this multiplication to an adder 34. Subsequent thereto, the real portion of the analytical sampled value $\bar{x}_n$ is fed to another multiplier 36, which multiplies the real portion of the analytical sampled value $\bar{x}_n$ by the coefficient s and delivers the result of this multiplication to an adder 38. The imaginary portion 16 of the analytical sampled value $\bar{x}_n$ that is generated by the digital filter 12 in the imaginary portion branch 16 is fed to a multiplier 40, which multiplies the imaginary part of the analytical sampled value $\bar{x}_n$ by the coefficient c and delivers the resulting product to the adder 38. The imaginary portion of the analytical sampled value $\bar{x}_n$ is additionally fed to another multiplier 42, which multiplies the imaginary portion of the analytical sampled value $\bar{x}_n$ by the coefficient s and delivers the resulting product to the adder 34. The adder 34 adds the signals fed to it and thus generates the real portion of the complex product $(\bar{x}_n \cdot \bar{z})$. The adder 38 subtracts the real portion of the analytical signal $\bar{x}_n$ that is multiplied by the coefficient c from the imaginary portion of the analytical sampled value $\bar{x}_n$ that is multiplied by the coefficient c. The result of the subtraction that is performed by the adder 38 is the imaginary portion of the complex product $(\bar{x}_n \cdot \bar{z})$.

In order to ultimately obtain the value on the right side of the equation (2), the real portion of the analytical sampled value $\bar{x}_n$ is fed to a delay element 44, which carries out a delaying of the signal fed to it by m sampling periods T and which feeds the delayed signal to a multiplier 46. In a corresponding manner, the imaginary portion of the analytical sampled signal $\bar{x}_n$ is fed to a further delay element 48 which delays this by m sampling periods T and delivers this delayed signal to a multiplier 50. The multipliers 46 and 50 respectively form the product of the signals fed to them and deliver the resulting product to an adder 52. The adder 52 finally forms the difference of the products fed to it by the multipliers 46 and 50 and, thus, generates the phase difference signal $y_n$ shown on the left side of the equation (2). The components 32 to 52 just described form the phase detection unit 28 which, together with the digital filter 12 represents the essential functional unit of the receiving means 30.

For purposes of illustrating the demodulation that is carried out with the receiving means 30 illustrated in FIG. 2, FIGS. 3a to 3c are again reviewed. The signals $x_{an}$, $x_n$ and $y_n$ illustrated in these Figures all relate to the same time range. This is established in FIG. 3a with the aid of a time scale and in FIGS. 3b and 3c with the aid of a scale indicating the number n of samplings performed. A comparison of the time diagrams as illustrated in FIGS. 3a and 3b to the time diagram depicted in FIG. 3c demonstrates that the payload signal that is impressed on the analog modulated signal $x_{an}$ and on the discrete-time sampled signal $x_n$ can be reliably recovered in the form of the phase difference signal $y_n$ illustrated in FIG. 3c even given the relatively low sampling rate of 8000 Hz.

Figure 3C:
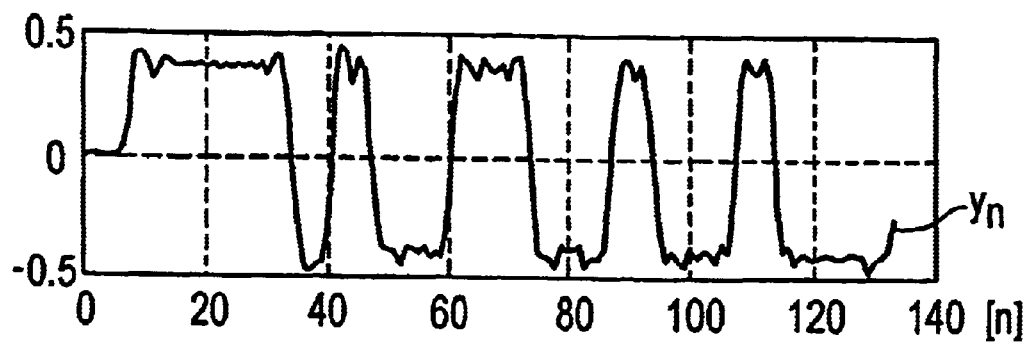
FIG. 3c shows the time diagram of a phase difference signal generated by the demodulation of the sampled signal illustrated in FIG. 4b.

For the phase difference signal $y_n$ depicted in FIG. 3c, the delay elements 44 and 48 of the receiving means 30 illustrated in FIG. 2 are so constructed as to delay the signals fed to them by one sampling period, respectively. The positive whole number m is thus set to 1 in this example. But a value other than 1 can be selected for m depending on the concrete development of the inventive receiving means.

Although the present invention has been described with reference to specific embodiments, those of skill in the art will recognize that changes may be made thereto without departing from the spirit and scope of the invention as set forth in the hereafter appended claims.

I claim:

1. A method of recovering a payload signal from a modulated signal that has been modulated by frequency shift keying, the method comprising the steps of:
   determining a discrete-time series of sampled values from the modulated signal; and
   determining, respectively, for each sampled value respectively serving as an observed sampled value, a phase difference relative to a preceding sampled value whose chronological spacing from the observed sampled value is smaller than a bit duration within the modulated signal.

2. A method of recovering a payload signal from a modulated signal that has been modulated by frequency shift keying as claimed in claim 1, further comprising the steps of:
   determining, respectively for each of the observed sampled values, a corresponding analytical sampled value;
   allocating the observed sampled value to a real portion of the analytical sampled value in unmodified form;
   allocating the observed sampled value to an imaginary part of the analytical sampled value phase-shifted –90°; and
   determining a phase difference for the observed sampled value on the basis of the analytical sampled value corresponding therewith wherein the analytical sampled value corresponding to the preceding sampled value is used to determine the phase difference.

3. A method of recovering a payload signal from a modulated signal that has been modulated by frequency shift keying as claimed in claim 2, wherein the phase difference that is determined for the observed sampled value is related to a reference phase difference occurring in a carrier signal that underlies the modulated signal.

4. A method of recovering a payload signal from a modulator signal that has been modulated by frequency shift keying as claimed in claim 2, further comprising the steps of:
   feeding the observed sampled values to a digital filter which determines the real portions and the imaginary portions of the analytical sampled values that respectively correspond to the observed sampled value; and
   feeding both the real portion and the imaginary portion of the analytical sampled value to a phase detection unit which determines the phase difference for the observed sampled value.

5. A method of recovering a payload signal from a modulated signal that has been modulated by frequency shift keying as claimed in claim 4, wherein a non-recursive filter is used as the digital filter.

6. A method of recovering a payload signal from a modulated signal that has been modulated by frequency shift keying as claimed in claim 4, further comprising the steps of:
   determining a phase signal, in the phase detection unit, indicating the phase of the observed sampled value;
   feeding the phase signal to a first adder and to a delay element;
   delaying the phase signal, via the delay element, by a whole-number multiple m of the sampling period T;
   feeding the delayed phase signal to the first adder;
   determining the phase difference for the observed sampled value, in the first adder, by forming the difference of the phase signal and the delayed phase signal;

feeding the phase difference for the observed sampled value to a second adder;

subtracting an offset value q corresponding to a reference phase difference, in the second adder, from the determined phase difference; and delivering the result of the subtraction as the payload signal.

7. A method of recovering a payload signal from a modulated signal that has been modulated by frequency shift keying as claimed in claim 4, further comprising the steps of:

multiplying, in the phase detection unit, the analytical sampled value $\bar{x}_n$ by a complex offset value $\bar{z}$, wherein the analytical sampled value $\bar{x}_n$ is defined by equation (1):

$$\bar{x}_n = A \cdot e^{j(2\pi f_0 nT + \phi_n)} = Re(\bar{x}_n) + j \cdot Im(\bar{x}_n), \quad (1)$$

(wherein n represents the run index of the observed sampled value, A represents the amplitude of the observed sampled value $x_n$, j represents the imaginary unit, $f_0$ represents the carrier signal, T represents the sampling period and $\phi_n$ represents the relative phase of the observed sampled value $x_n$ relative to the carrier signal), and wherein the complex offset value $\bar{z}$ is defined by the equation (2):

$$\bar{z} = e^{-j2\pi f_0 mT}, \quad (2)$$

wherein m is a positive whole number;

multiplying a result of the above multiplication by a conjugated complex sampled value $\bar{x}_{n-m}$ that has been delayed by m-fold the sampling period T; and calculating a phase difference signal $y_n$ that serves as the payload signal by forming the imaginary part of this product, the phase difference signal being defined in equation (3):

$$y_n = A^2 \sin(\phi_n - \phi_{n-m}) = Im\{(\bar{x}_n \cdot \bar{z}) \cdot \bar{x}^*_{n-m}\}. \quad (3)$$

8. A method of recovering a payload signal from a modulated signal that has been modulated by frequency shift keying as claimed in claim 6, wherein m equals 1.

9. A method of recovering a payload signal from a modulated signal that has been modulated by frequency shift keying as claimed in claim 1, wherein the modulated signal is sampled at a sampling rate of 8000 Hz.

10. A method of recovering a payload signal from a modulated signal that has been modulated by frequency shift keying as claimed in claim 1, wherein the method is applied in a digital PBX that is connected to an analog telephone network.

11. An apparatus for implementing a method of recovering a payload signal from a modulated signal that has been modulated by frequency shift keying, comprising:

a device for determining a discrete-time series of sampled values from the modulated signal; and a phase detection unit which, for the sampled values, respectively determines a phase difference relative to a preceding sampled value whose chronological spacing from an observed sampled value is smaller than a bit duration in the modulated signal.

12. An apparatus for implementing a method of recovering a payload signal from a modulated signal that has been modulated by frequency shift keying as claimed in claim 11, wherein the device for determining a discrete-time series of sampled values is a digital filter connected to the phase detection unit upstream which respectively determines an analytical sampled value from a corresponding observed sampled value, allocates the observed sampled value to a real part of the analytical signal in unmodified form and allocates the observed sampled value to an imaginary part of the analytical signal phase-shifted−90°, and feeds the determined analytical sampled values to the phase detection unit, and wherein the phase detection unit determines the phase difference for the observed sampled value on the basis of the analytical sampled value corresponding thereto and on the basis of the analytical sampled value corresponding to the preceding sampled value used to determine the phase difference.

13. An apparatus for implementing a method of recovering a payload signal from a modulated signal that has been modulated by frequency shift keying as claimed in claim 12, wherein the digital filter is a non-recursive filter.

14. An apparatus for implementing a method of recovering a payload signal from a modulated signal that has been modulated by frequency shift keying as claimed in claim 12, further comprising:

a computing unit in the phase detection unit for detecting a phase signal specifying the phase $\phi_n$ of the observed sampled value;

a delay element connected to the computing unit downstream which delays the phase signal by a whole-number multiple m of the sampling period T;

a first adder connected to the computing unit downstream which receives from the delay element the delayed phase signal and which determines the phase difference for the observed sampled value by forming the difference of the phase signal and the delayed phase signal; and a second adder which receives the phase difference from the first adder and subtracts an offset value q corresponding to a reference phase difference from the determined phase difference and delivers a result of this subtraction as the payload signal.

15. An apparatus for implementing a method of recovering a payload signal from a modulated signal that has been modulated by frequency shift keying as claimed in claim 11, wherein the apparatus is part of a digital PBX that is connected to an analog telephone network.

* * * * *